United States Patent
Goto et al.

(10) Patent No.: US 8,102,558 B2
(45) Date of Patent: Jan. 24, 2012

(54) IMAGE SUPPLY APPARATUS, CONTROL METHOD THEREFOR, AND PRINTING SYSTEM

(75) Inventors: Fumihiro Goto, Kanagawa (JP); Hiromitsu Hirabayashi, Kanagawa (JP); Takao Aichi, Tokyo (JP); Akitoshi Yamada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 978 days.

(21) Appl. No.: 11/043,147

(22) Filed: Jan. 27, 2005

(65) Prior Publication Data

US 2005/0134892 A1 Jun. 23, 2005

Related U.S. Application Data

(63) Continuation of application No. PCT/JP03/09871, filed on Aug. 4, 2003.

(30) Foreign Application Priority Data

Aug. 5, 2002 (JP) ................................. 2002-228032

(51) Int. Cl.
- H04N 5/225 (2006.01)
- H04N 5/76 (2006.01)
- B41J 29/393 (2006.01)
- G06K 15/00 (2006.01)
- G06F 3/00 (2006.01)
- G06F 3/12 (2006.01)
- G06F 17/00 (2006.01)

(52) U.S. Cl. ............... 358/1.18; 348/207.2; 348/231.9; 347/19; 710/5; 358/1.16; 358/1.15; 715/255; 715/205

(58) Field of Classification Search ................. 710/11, 710/5; 347/19; 348/207.2, 231.99, 231.2; 358/1.18
See application file for complete search history.

(56) References Cited

U.S. PATENT DOCUMENTS

| | | | |
|---|---|---|---|
| 5,745,360 A | 4/1998 | Leone et al. | ................. 364/140 |
| 6,074,111 A | 6/2000 | Kasahara | .......................... 400/76 |
| 6,115,137 A | 9/2000 | Ozawa et al. | ................... 358/1.6 |
| 6,166,826 A | 12/2000 | Yokoyama | |
| 6,184,996 B1 * | 2/2001 | Gase | ............................ 358/1.15 |
| 6,243,174 B1 | 6/2001 | Fukasawa | |

(Continued)

FOREIGN PATENT DOCUMENTS

EP 0859326 8/1998

(Continued)

OTHER PUBLICATIONS

Russian Office Action dated Dec. 7, 2006.

(Continued)

*Primary Examiner* — Akwasi M Sarpong
(74) *Attorney, Agent, or Firm* — Fitzpatrick, Cella, Harper & Scinto

(57) ABSTRACT

According to this invention, an intended image is transferred and printed even in a system which transfers image data by a handle upon reception of a print request list described by the file name of an image. In order to realize this, according to this invention, when a DPOF print request file which describes an image to be printed by the file name of the image exists in the memory card of a digital camera (3012) serving as an image supply side, a new file in which the file name in the print request file is replaced by a handle is generated and transmitted to a printer (1000).

8 Claims, 12 Drawing Sheets

U.S. PATENT DOCUMENTS

| | | | |
|---|---|---|---|
| 6,552,743 B1 * | 4/2003 | Rissman | 348/207.2 |
| 6,717,694 B1 | 4/2004 | Fukunaga et al. | 358/1.16 |
| 7,031,005 B1 | 4/2006 | Nakanishi | 358/1.15 |
| 7,039,727 B2 * | 5/2006 | Camara et al. | 710/5 |
| 7,167,269 B2 * | 1/2007 | Wu et al. | 358/1.18 |
| 7,262,873 B1 * | 8/2007 | Rasche et al. | 358/1.15 |
| 7,369,164 B2 * | 5/2008 | Parulski et al. | 348/231.99 |
| 7,414,746 B2 | 8/2008 | Tanaka et al. | |
| 2001/0013949 A1 * | 8/2001 | Tateyama | 358/1.16 |
| 2001/0042142 A1 | 11/2001 | Fukunaga et al. | 710/11 |
| 2001/0048534 A1 | 12/2001 | Tanaka et al. | |
| 2002/0010722 A1 * | 1/2002 | Takayama | 707/527 |
| 2002/0178304 A1 * | 11/2002 | Camara et al. | 710/11 |
| 2003/0085942 A1 * | 5/2003 | Narusawa et al. | 347/19 |
| 2003/0189644 A1 * | 10/2003 | Kikugawa | 348/207.2 |
| 2005/0253930 A1 | 11/2005 | Endo et al. | 348/207.1 |

FOREIGN PATENT DOCUMENTS

| | | |
|---|---|---|
| EP | 1 158 763 A2 | 4/2001 |
| JP | 10-248014 A | 9/1998 |
| JP | 10-322505 | 12/1998 |
| JP | 2000-057067 | 2/2000 |
| JP | 2000-059402 | 2/2000 |
| JP | 2000-108468 | 4/2000 |
| JP | 2000-118086 | 4/2000 |
| JP | 2001-088374 | 4/2001 |
| JP | 2001-148068 | 5/2001 |
| JP | 2001-275066 | 10/2001 |
| JP | 2001-333363 | 11/2001 |
| JP | 2002-111926 | 4/2002 |
| JP | 2003-154732 A | 5/2003 |
| JP | 2003-256154 | 9/2003 |
| JP | 2003-256154 A | 9/2003 |
| JP | 2003-256170 A | 9/2003 |
| JP | 2003-259274 | 9/2003 |
| RU | 2 129 725 C1 | 4/1999 |
| RU | 13102 U1 | 3/2000 |
| WO | 98/03923 | 1/1998 |

OTHER PUBLICATIONS

Japanese Office Action dated Dec. 25, 2006.
European Communication and Search Report regarding Application No. 03766724.3-1245 / 1540457 PCT/JP0309871.
European Search Report dated Jul. 11, 2011, issued in European Application No. 11153098.6-1245/2312430.

* cited by examiner

FIG. 7

```
[HDR]
GEN REV = 01.10
GEN CRT = "DIGITALCAMERA S30" –01.00
GEN DTM = 2002 : 07 : 31 : 14 : 48 : 49

[JOB]
PRT PID = 001
PRT TYP = STD
PRT QTY = 002
IMG FMT = EXIF2 –J
<IMG SRC = ". . /DCIM/105GANON/IMG_0572. JPG">

[JOB]
PRT PID = 002
PRT TYP = STD
PRT QTY = 001
IMG FMT = EXIF2 –J
<IMG SRC = ". . /DCIM/105GANON/IMG_0573. JPG">
```

FIG. 8

CONVERSION TO Job Format

```
<?XML version = "1.0"?>
<command ("DPS_Job")>
<Job>
    <Capability>
        <quality ("1000")>
        <paper_size ("2001")>
        <paper_type ("3002")>
        <image_type ("4000")>
        <date ("5000")>
        <file_name ("6000")>
        <image_optimize ("7001")>
        <layout ("8001")>
    </capability>
    <printlist>
        <image (00000001)>
        <image (00000002)>
    </printlist>
</Job>
```

IMAGE SUPPLY APPARATUS, CONTROL METHOD THEREFOR, AND PRINTING SYSTEM

CROSS-REFERENCE TO RELATED APPLICATIONS

This application is a continuation of International Application No. PCT/JP03/09871, filed Aug. 4, 2003, which is hereby incorporated by reference in its entirety.

TECHNICAL FIELD

The present invention relates to a print system, image supply apparatus, and control method therefor.

BACKGROUND ART

Recent printers have sufficient print quality, and can print, e.g., a natural image with a quality equivalent to a photograph.

The number of image sensing pixels of a digital still camera (to be referred to as a DSC hereinafter) has reached several million, and the quality of a photographed image has become comparable to that of a silver halide camera.

In this background, demands have arisen for printing by a printer an image photographed by a digital camera without the mediacy of a personal computer (to be referred to as a PC hereinafter). Several products which meet these demands are available at present.

One of such products gives a great deal of attention to the fact that the DCS utilizes a removal storage medium (there are various memory cards using a flash memory). The storage medium is removed from the DSC and set into the slot of the printer to read out and print image data.

To print all images stored in the storage medium one by one, images stored in the storage medium are sequentially read out without any condition, which does not pose any technical problem.

In practice, there are needs to select an image to be printed and another image, and/or designate the number of prints for each image.

As one solution to this, DPOF (Digital Print Order Format) is receiving a great deal of attention. DPOF will be briefly explained.

The DSC generally comprises a liquid crystal display for confirming a photographed image and displaying various menus, and is also equipped with various keys (buttons). By using the display and keys, an image to be printed is selected, and the number of prints of the image is designated. The designation contents are stored as a file in a storage medium which stores the image. When the storage medium is set in a printer, a print process is done for the image in accordance with the file which describes the designation contents.

This is an outline of DPOF. The above function can be realized as far as both of the DSC and printer support DPOF.

As described above, print request contents generated on the DSC side are a DPOF text file. DSCs are projected to have a larger number of functions and describe information other than an image to be simply printed and the number of prints. For example, DSCs may describe finer designations such as designation of the size of an image to be printed and the size of a print sheet, and designation of a layout of a plurality of images on one print sheet.

The problem which arises in this case is that setups using the DSC are performed independently of the printer. For example, print sheets in various sizes can be set in even a DPOF printer, and the sheet size may be different from that set by the DSC.

This problem occurs because print setups by the DSC are done independently of the printer, as described above.

For this reason, another measure is required. As one solution, a USB (Universal Serial Bus) which is a PC connection interface of a general DSC is used to allow the DSC and printer to directly communicate with each other.

If such environment can be constructed, the DSC can grasp the printer capacity, and print conditions can be set in consideration of the capacity (or function or state), solving the above problem. In this case, the following problems must be solved.

1. A printer connected to a DSC is not the same, and it is difficult to construct the user interface of the DSC in consideration of the printer capacity. This is because items (e.g., the size and type of available print medium, print quality, and layout) in the printer capacity are not independent and linked items are different between printers.

2. In general, a DPOF file is stored in a removable medium such as a CF card. Many cameras support DPOF subsets, and whether another camera can analyze a DPOF file stored in a removable medium depends on the DPOF subset supported by the camera.

For these two reasons, a file designation method used in an interface and a file designation method in a DPOF file are not always the same though a DPOF file can be analyzed by the printer by attaching a "DPOF print" button or the like to the DSC and transmitting a DPOF file to the printer. The user is confused by print instructions with different print designation methods.

Even if the DSC is directly physically connected to the printer via the interface of the DSC, it is difficult to specify each image in the DSC by a protocol used in the interface.

As described above, the DPOF describes print instruction contents in the text format. A description which designates an image directly uses a directory name and file name under which the image file is stored.

Upon connecting the DSC and printer, the process complies with PTP (Picture Transfer Protocol). However, even if the DSC transfers to the printer a file which describes print instruction contents in the DPOF format, the printer cannot request a file described by a path name from the DSC. This is because PTP does not have a command for designating a file by a path name.

DPOF has been described, and this also applies to a description language such as a markup language including HTML or XML in which an image file is linked by a path name to constitute a window.

DISCLOSURE OF INVENTION

The present invention has been made in consideration of the conventional drawbacks, and has as its object to provide an image supply apparatus capable of transferring and printing an intended image even in a system which transfers image data by a handle upon reception of a print request list described by the file name of an image, a method of controlling the image supply apparatus, and a print system.

To achieve the above object, a print system according to the present invention has the following arrangement.

That is, an image supply apparatus which has an interface for directly connecting a printer, receives a transfer request for image data to be printed from the printer by a handler that specifies image data stored in a removable storage medium, and supplies an image specified by the handler to the printer comprises conversion means for, when the image supply apparatus can directly communicate with the printer via the interface and a print request list file which describes by a file name an image to be printed exists in the storage medium, performing a conversion process in order to generate a new print request list file in which at least a description of the file name in the print request list file is converted into a description expressed by a handler, and means for transmitting the new print request list file converted by the conversion means as an object to the printer.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the descriptions, serve to explain the principle of the invention.

FIG. 7 is a view showing an example of the contents of a DPOF file according to the embodiment;

FIG. 8 is a view showing file contents after conversion of the DPOF file shown in FIG. 7;

BEST MODE FOR CARRYING OUT THE INVENTION

A preferred embodiment of the present invention will be described below with reference to the accompanying drawings.

First Example

Description of Basic Arrangement

A basic arrangement according to this embodiment will be described. A method of printing an image stored in the storage medium of a digital still camera (DSC) in an environment where a printer can directly communicate with the DSC will be called a photo direct print method.

Figure 1:
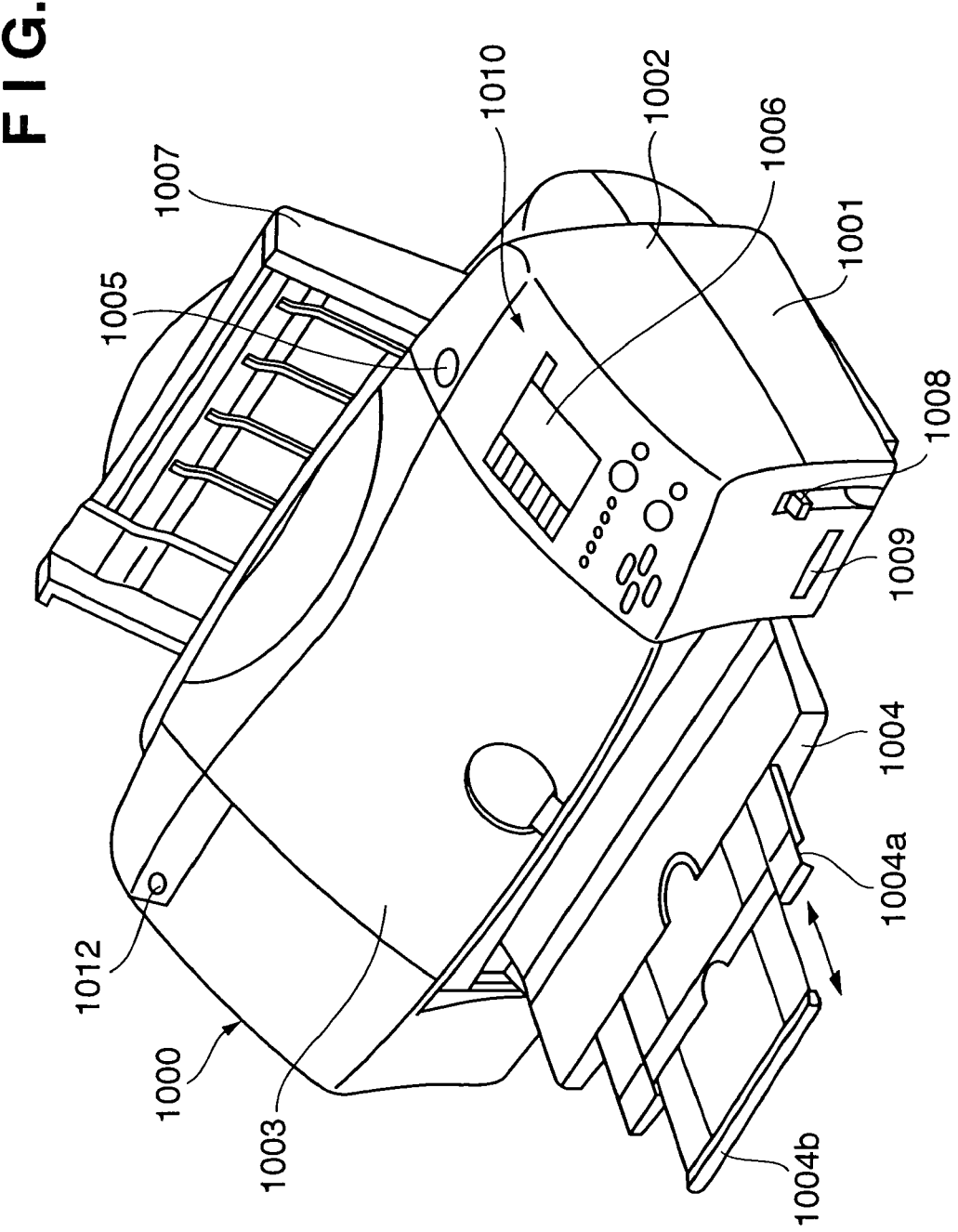
FIG. 1 is a schematic view of the outer appearance of a printer according to an embodiment.
Figure 2:
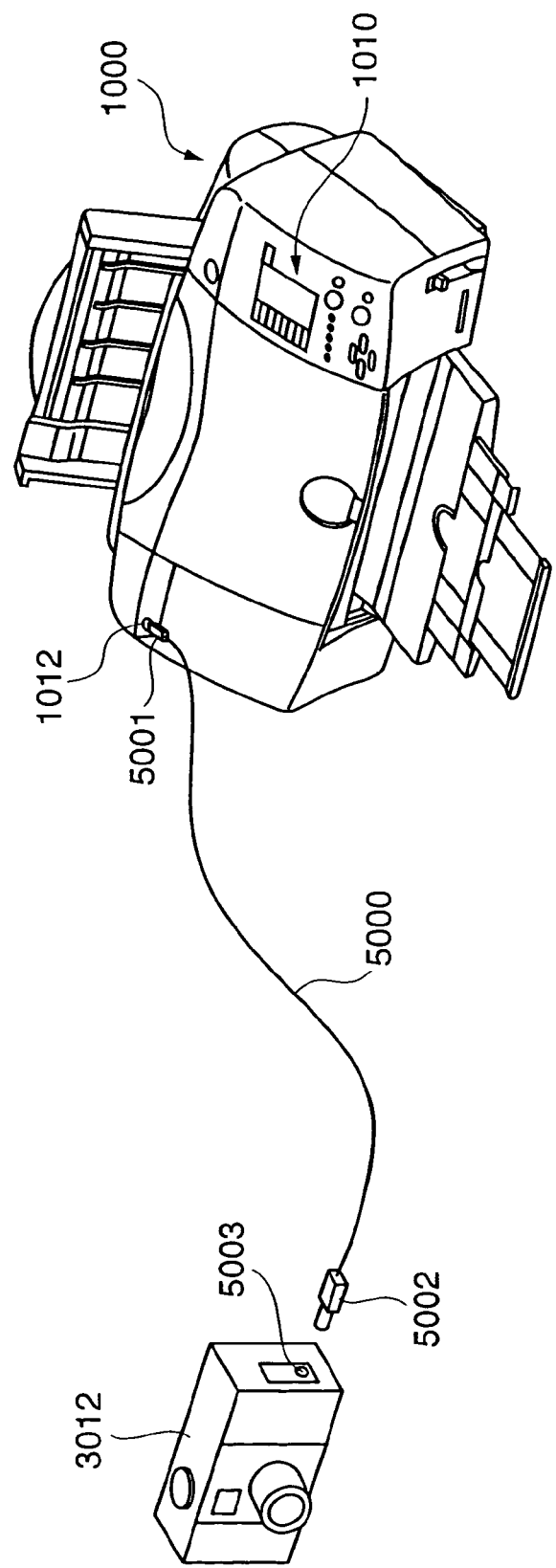
FIG. 2 is a schematic view of connection between a digital camera and the printer according to the embodiment.

FIG. 1 is a schematic view of the outer appearance of a photo direct printer (to be referred to as a PD printer) according to this embodiment. FIG. 2 shows a state in which the DSC is directly connected to the printer.

Referring to FIG. 1, a PD printer 1000 has a general PC printer function of printing data received from a host computer (PC), a function (DPOF function) of printing image data directly read from a storage medium such as a memory card, and a function of printing image data directly received from a digital camera by direct communication with the DSC (to be described later).

A main body which forms a housing of the PD printer 1000 has a case M 1001, upper case 1002, access cover 1003, and exhaust tray 1004 as exterior members. The lower case 1001 nearly forms the lower half portion of the PD printer 1000, and the upper case 1002 nearly forms the upper half portion of the main body. By combining these cases, a hollow structure which has a storage space that stores mechanisms to be described later is formed. Openings are respectively formed on the upper and front surfaces of the main body. One end portion of the exhaust tray 1004 is rotatably held by the lower case 1001, and rotation of the tray 1004 opens/closes the opening formed on the front surface of the lower case 1001. For this reason, upon making the printer execute a print process, the exhaust tray 1004 is rotated toward the front surface side to open the opening, so that print sheets can be exhausted from the opening. The exhausted print sheets are stacked on the exhaust trays 1004 in turn. The exhaust tray 1004 stores two auxiliary trays 1004a and 1004b. When these auxiliary trays are pulled out as needed, the loading area of print sheets can be enlarged/reduced in three steps.

One end portion of the access cover 1003 is rotatably held by the upper case 1002 to be able to open/close the opening formed on the upper surface of the main body. When the access cover 1003 is opened, a printhead cartridge (not shown), ink tanks (not shown), or the like housed in the main body can be exchanged. Although not shown, when the access cover 1003 is opened/closed, a projection formed on the rear surface of the cover 1003 rotates a cover open/close lever. By detecting the rotation position of the lever using a microswitch or the like, the open/close state of the access cover is detected.

A power key 1005 is arranged on the upper surface of the upper case 1002 so that the user can press it. The upper case 1002 comprises a control panel 1010 having various key switches and the like. Reference numeral 1007 denotes an automatic feeder which automatically conveys a print sheet into the apparatus main body. Reference numeral 1008 denotes a paper gap select lever which is used to adjust the gap between the printhead and a print sheet. Reference numeral 1009 denotes a card slot which receives an adapter that can receive a memory card. As this memory card, for example, a Compact Flash Memory® card, Smart Media® card, Memory Stick®, and the like are available. The memory card is removed from the DSC and set to provide a DPOF print function.

Reference numeral 1012 denotes a terminal used to connect a digital camera (to be described later). The digital camera generally uses a USB (Universal Serial Bus) as a means for connecting a personal computer (PC), and the terminal 1012 also adopts a USB interface form in this embodiment. However, another communication means can also be employed. The printer can be connected to the digital camera on the front surface of the printer in order to simplify connection, as shown in FIG. 1.

The PD printer 1000 comprises an interface for realizing even printing from a personal computer (PC). In general, the PD printer 1000 is kept connected to the PC once connected to the PC without any special reason. Thus, the interface terminal is provided on the back surface. The connection interface with the PC may be a parallel interface available from Centronics, a USB interface, or the like as far as the interface supports at least a two-way communication function.

FIG. 2 shows a state in which the PD printer 1000 and a digital camera 3012 according to this embodiment are connected.

Referring to FIG. 2, a cable 5000 (USB cable) comprises a connector 5001 to be connected to the connector 1012 of the PD printer 1000, and a connector 5002 to be connected to a connector 5003 of the digital camera 3012. When the digital camera 3012 is to be connected to a PC, the connector 5001 is connected to the USB connector of the PC, and then a sensed image can be transferred to the PC.

The digital camera 3012 can output image data saved in an internal memory via the connector 5003. The digital camera 3012 can take various arrangements such as an arrangement having an internal memory as a storage means and an arrangement having a slot for inserting a removal memory. In this manner, the PD printer 1000 and digital camera 3012 are connected via the cable 5000 shown in FIG. 2, and image data from the digital camera 3012 can be directly printed by the PD printer 1000.

Figure 3:
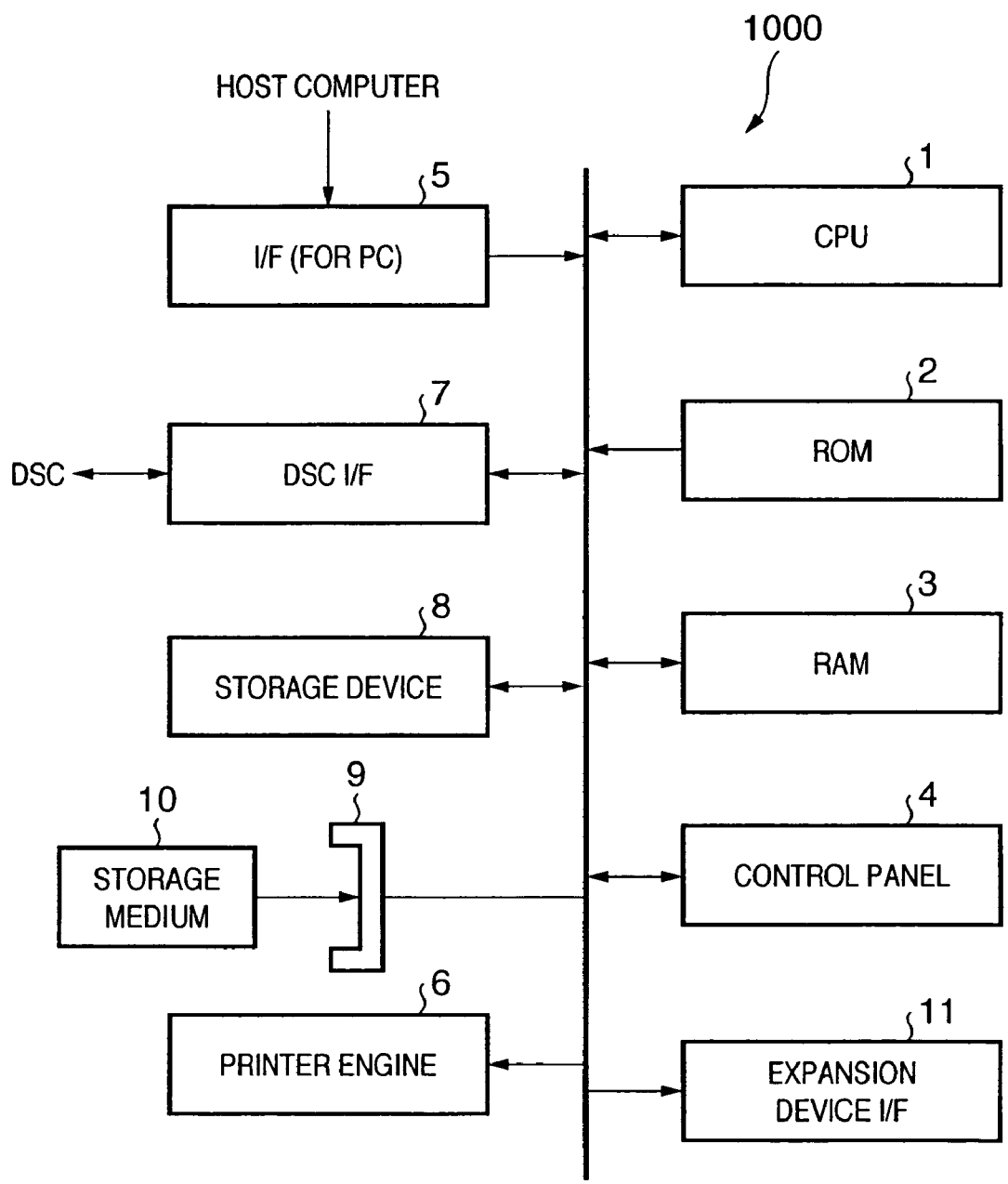
FIG. 3 is a block diagram of the printer according to the embodiment.

FIG. 3 is a block diagram of the control system of the PD printer 1000 according to this embodiment.

Referring to FIG. 3, reference numeral 1 denotes a CPU which controls the overall apparatus; 2, a ROM which stores the operation processing sequence (program) of the CPU 1 and fonts; and 3, a RAM which is used as a work area of the CPU 1. Reference numeral 4 denotes a control panel (corresponding to 1010 in FIG. 1). Reference numeral 5 denotes an interface for connecting a PC; and 7, an interface (the host side of the USB) which connects a digital still camera. Reference numeral 9 denotes a card interface which can connect an adaptor (PCMCIA) 10 holding a memory card. The card interface 9 allows the PD printer 1000 to realize DPOF, i.e., to read a description file which is stored in a memory card upon photographing by a digital camera and associated with a print instruction, and to print an image in accordance with the description file. Reference numeral 6 denotes a printer engine which discharges ink by using heat energy in this embodiment though the printing method is not limited to this. Reference numeral 11 denotes an interface for connecting an expansion device, details of which will be described later. The interface 11 can connect, e.g., a display device which is prepared as an option and displays an image.

Figure 4:
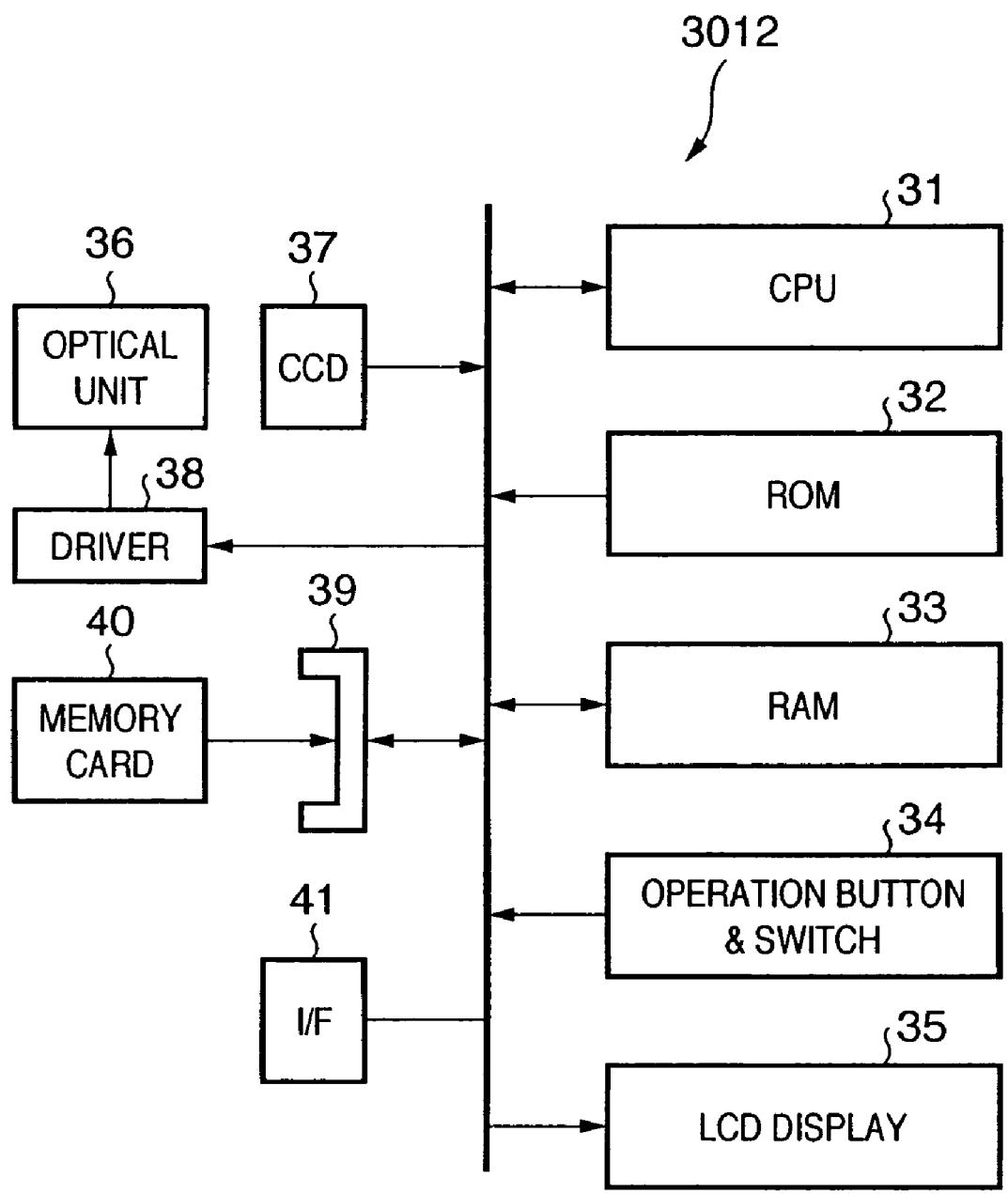
FIG. 4 is a block diagram of the digital camera according to the embodiment.

FIG. 4 is a block diagram of the DSC (Digital Still Camera) 3012. Referring to FIG. 4, reference numeral 31 denotes a CPU which controls the entire DSC; and 32, a ROM which stores the processing sequence (program) of the CPU 31. Reference numeral 33 denotes a RAM which is used as a work area of the CPU 31; and 34, a switch group which is used to make various operations. Reference numeral 35 denotes a liquid crystal display which is used to confirm a sensed image and display a menu upon making various setups. Reference numeral 36 denotes an optical unit which mainly comprises a lens and its drive system. Reference numeral 37 denotes a CCD element; and 38, a driver which controls the optical unit 36 under the control of the CPU 31. Reference numeral 39 denotes a connector for connecting a storage medium 40 (compact flash memory card, smart media card, or the like); and 41, a USB interface (the slave side of the USB) for connecting the PC or PD printer 1000 of this embodiment.

The arrangements of the PD printer and DSC of this embodiment have been explained. As for conventional DPOF printing of removing a memory card from the DSC 3012, setting the memory card in the slop 1009 of the PD printer 1000, and printing in accordance with a print instruction file stored in the memory card, operation complying with DPOF printing is performed, and a description thereof will be omitted. This embodiment will explain a case wherein the DSC 3012 and PD printer 1000 are connected by the cable 5000 and can directly communicate with each other.

Figure 5:
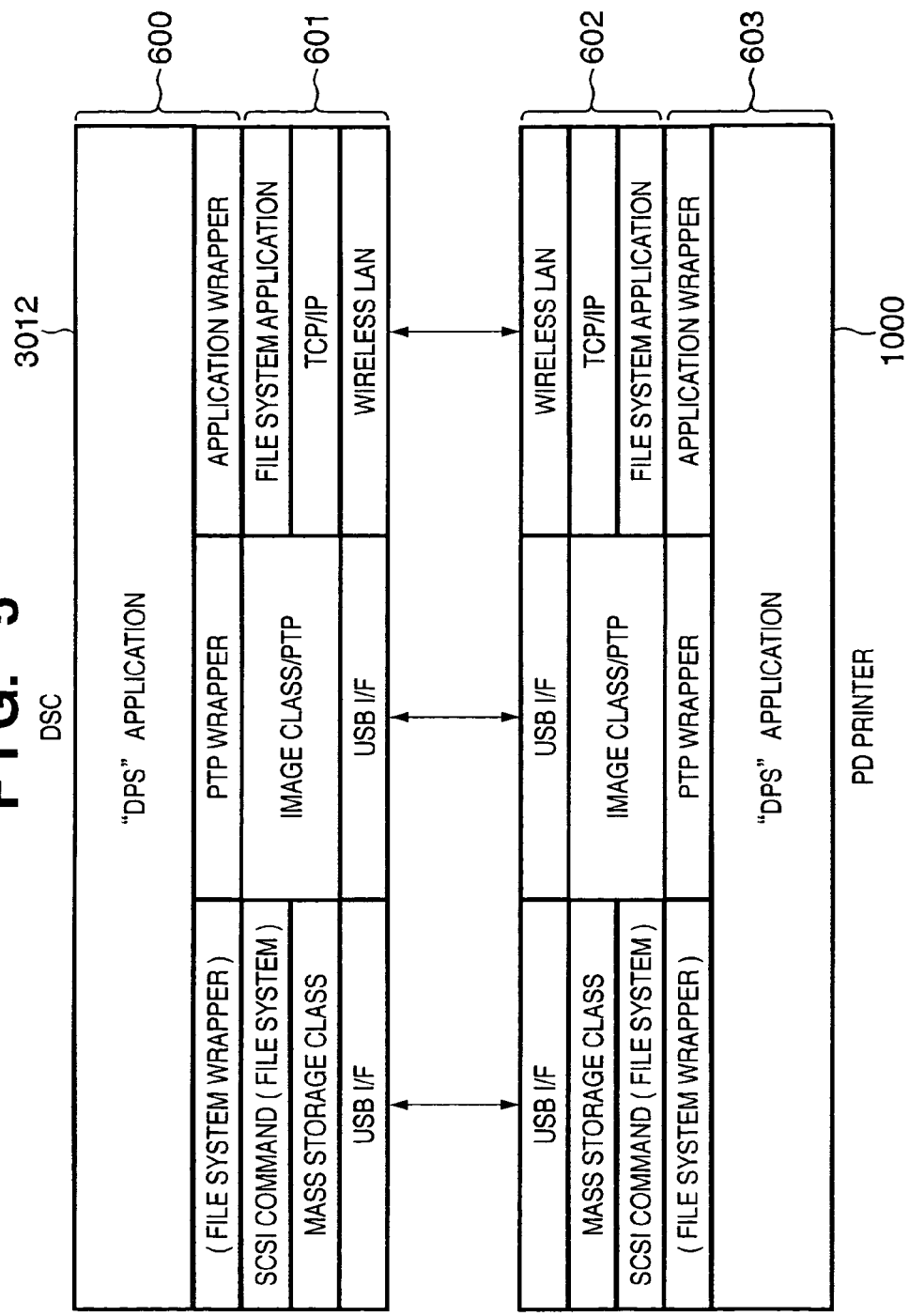
FIG. 5 is a view showing a layer structure associated with communication between the digital camera and the printer according to the embodiment.

FIG. 5 shows a connection layer upon direct connection. In FIG. 5, the upper side represents a DSC (digital camera) layer, and the lower side represents a PD printer layer.

FIG. 5 also illustrates SCSI and wireless TCP/IP as communication means. In this case, connection by a USB interface will be explained.

In the layer structure shown in FIG. 5, known PTP (Picture Transfer Protocol) is used for USB communication. In this embodiment, the DSC 3012 uses a USB interface prepared for connection to a PC, and this interface is connected to the PD printer. The DSC 3012 functions as a USB slave, and the PD printer 1000 functions as a USB host. In the connection state, system control is given to the PD printer 1000.

Figure 6:
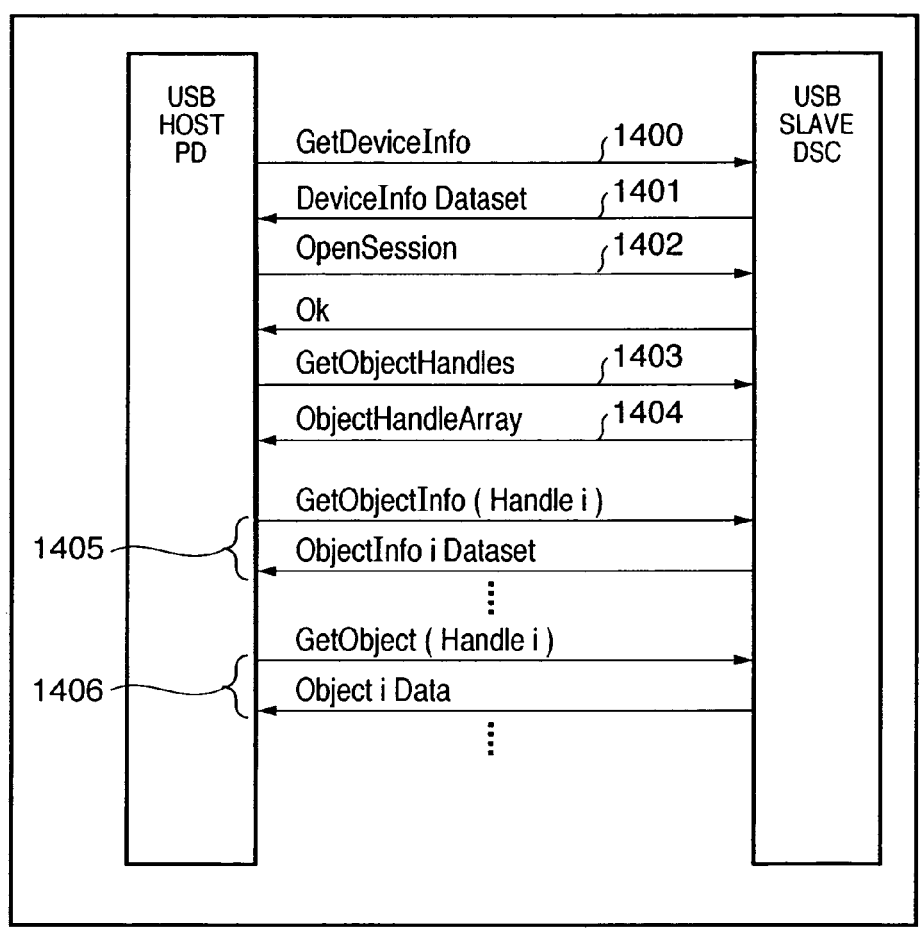
FIG. 6 is a view showing a connection sequence by a general PTP protocol upon connecting the digital camera and printer according to the embodiment.

FIG. 6 shows general PTP communication procedures. For descriptive convenience, the USB host is the PD printer, and the USB slave is the DSC 3012 in this embodiment, and this relationship is illustrated in FIG. 6.

In procedure 1400, the PD printer 1000 transmits a PTP command GetDeviceInfo to the DSC 3012. At this time, the PD printer 1000 does not know the connected device, and inquires it. In response to this, the DSC 3012 transmits (notifies) information on the DSC 3012 to the PD printer 1000 by DeviceInfo Dataset.

In procedure 1402, the PD printer 1000 assigns the DSC 3012 as a resource by a PTP command OpenSession. If necessary, a procedure of assigning a handle to a data object or performing special initialization starts.

In procedure 1403, the PD printer 1000 requests a handle from the DSC 3012. That is, in order to specify an unknown object (photographed image, script, or the like) of the DSC 3012, the PD printer 1000 requests a number uniquely assigned to the object of the DSC 3012. In procedure 1404, a handle list held by the DSC 3012 is sent back in response to this request (i.e., the number of objects is notified).

As a result, the PD printer 1000 is notified of the number of objects held by the DSC (print instruction files by DPOF (to be referred to as DPOF files hereinafter), and sensed-image files).

If the PD printer inquires the ith object, the PD printer requests attribute information (e.g., whether the object is an image or a text such as a script) on the ith object by GetObjectinfo(i), and receives the result as Objectinfo i Dataset (procedure 1405).

As for an object recognized as an image, the contents of Objectinfo i Dataset are analyzed, and the file name and path name of the object are stored in a list in association with the handle. By this association, a file name designated in a DPOF file can be converted into a handle for designating an image by PTP.

By repeating these procedures, the PD printer 1000 can obtain the attributes of all the objects held by the DSC 3012.

If the attribute represents image data, the PD printer issues GetObject by using a handle representing the image data, and receives the result as SendObjectInfo to obtain image data (procedure 1406).

By these procedures, the PD printer and DSC can exchange information. In PTP, however, the PD printer 1000 cannot directly request an image file to be printed by using a path name in the memory card of the DSC 3012.

This will be explained in more detail.

Assume that designation of an image to be printed and setting of the number of prints have already been done using the UI of the DSC 3012. In other words, a corresponding DPOF file has already been stored in the memory card of the DSC 3012 (a case wherein print setups are performed after connection to the PD printer will be described later). A process of creating a DPOF file is well known, and a detailed description thereof will be omitted.

In this situation, the PD printer 1000 can recognize by GetObjectInfo which object is the handle of a DPOF file (text file as described above). The PD printer 1000 can obtain the contents of the file by GetObject using the handle. Even if the PD printer 1000 receives this file, a description which specifies an image in the file is directory name+directory name+ . . . +file name traced from the root of the memory card 40. PTP does not have any means for directly requesting the file. By using the PTP, an image can only be acquired using a handle, so printing cannot be carried out by PTP directly using information representing a print target described in the DPOF file.

The embodiment solves this problem. Examples of the solution will be described.

FIG. 7 shows an example of the contents of a DPOF file created by the DSC 3012.

Referring to FIG. 7, images to be printed are represented by two lines:

../DCIM/105GANON/IMG_0572.JPG
../DCIM/105GANON/IMG_0573.JPG

This means that a directory "DCIM" exists and contains a subdirectory "105GANON", and a file name "IMG_0572.JPG" or "IMG_0573.JPG" in "105GANON" is designated as a print target.

Even if the PD printer receives a file having such description from the DSC 3012, the PD printer cannot request the file by the current format. For this reason, when a DPOF file exists in the internal memory card 40 of the DSC 3012 after it becomes possible for the DSC 3012 to directly communicate with the PD printer 1000 and the attributes of all the objects held by the DSC 3012 are recognized, the DSC 3012 in this embodiment creates a new file (to be referred to as a print instruction or print instruction file hereinafter) by converting a path-attached file name described in the file into information representing an internal handle.

For example,

../DCIM/105GANON/IMG_0572.JPG to handle "00000001"
../DCIM/105GANON/IMG_0573.JPG to handle "00000002"

In this case, a file (text) shown in FIG. 8 is created as a print instruction by the conversion process. In FIG. 8, <image(00000001)> and <image(00000002)> represent portions which are converted into handlers for specifying a file.

The converted print instruction file is also one object, and this object is also assigned a handler. The conversion timing is the initial stage upon connecting the DSC 3012 to the PD printer 1000. For example, as shown in FIG. 6, a conversion process starts upon reception of GetDeviceInfo or OpenSession from the PD printer. In this embodiment, the CPU 31 of the DSC 3012 executes a DPOF file conversion process upon reception of OpenSession as a trigger.

When viewed from the PD printer 1000, the DSC 3012 seems to have at least two files having a text attribute (DPOF file and converted print instruction file). The PD printer 1000 receives the contents of these files by a GetObject command, utilizes a file which contains a character string (e.g., <command(DPS_Job)>) representing a specific command, and prints the data.

More specifically, data in the format shown in FIG. 8 is received, and image data which is requested by the user to be printed can be received by a GetObject command using handles "00000001" and "00000002". That is, an intended image can be printed, solving the above-mentioned problem.

Figure 9:
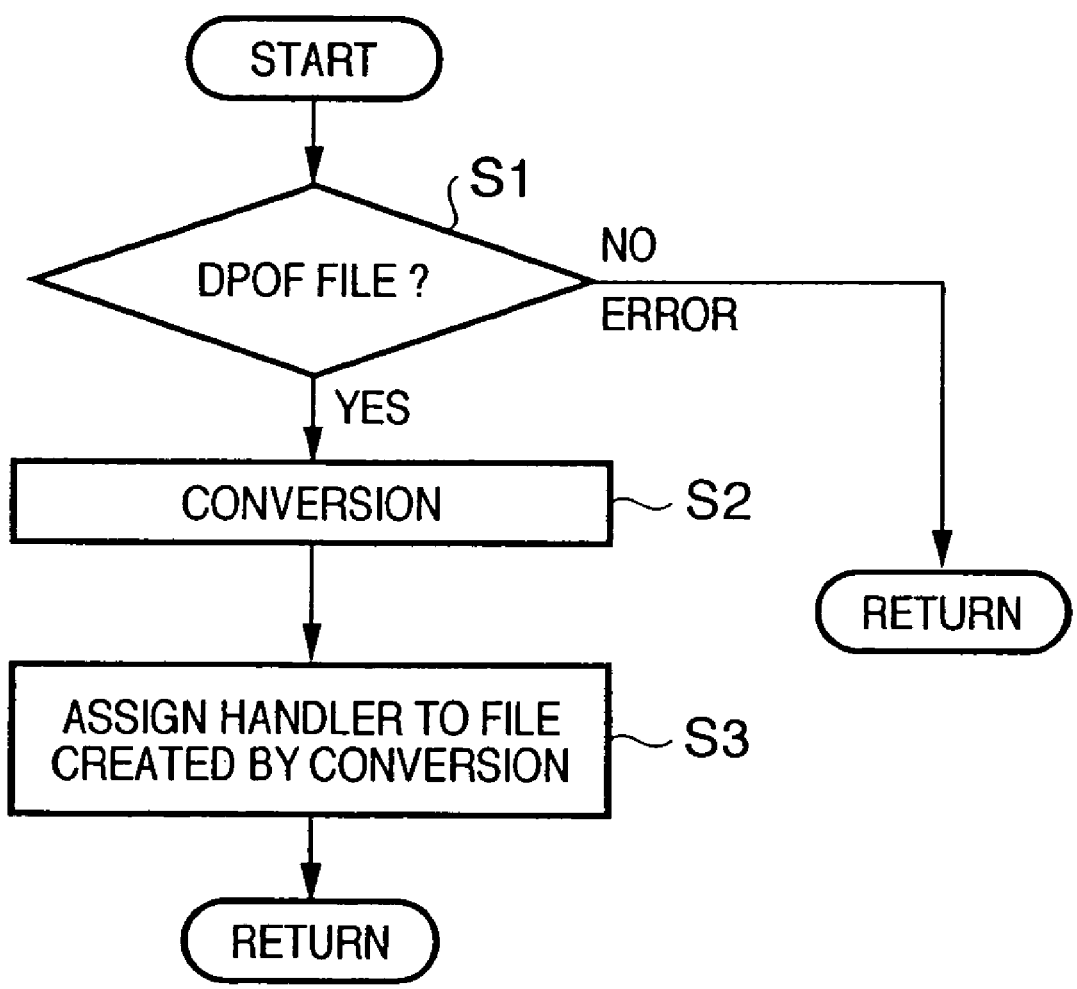
FIG. 9 is a flow chart showing part of the process of the digital camera according to the embodiment.

In order to realize this process, the DSC 3012 performs a process shown in FIG. 9. FIG. 9 shows a process which is called upon reception of an OpenSession command. Handles for all the objects held by the DSC 3012 have already been determined.

In step S1, whether a DPOF print instruction file which is created in accordance with contents set by a preceding print setup process exists in the memory card 40 is determined. If NO in step S1, an error is determined. For example, a process of displaying on the display panel 4 a message that no print instruction contents exist or no print setups exist is executed.

If YES in step S1, a new file (print instruction) in which a path name-attached file name described in the file is replaced by a handle is created (step S2). In step S2, as described above, a conversion process of information which designates an image to be printed is performed using a list in which file names and path names are associated with handle numbers. In step S3, a new handle is assigned to the created file, and this process ends.

Figure 10:
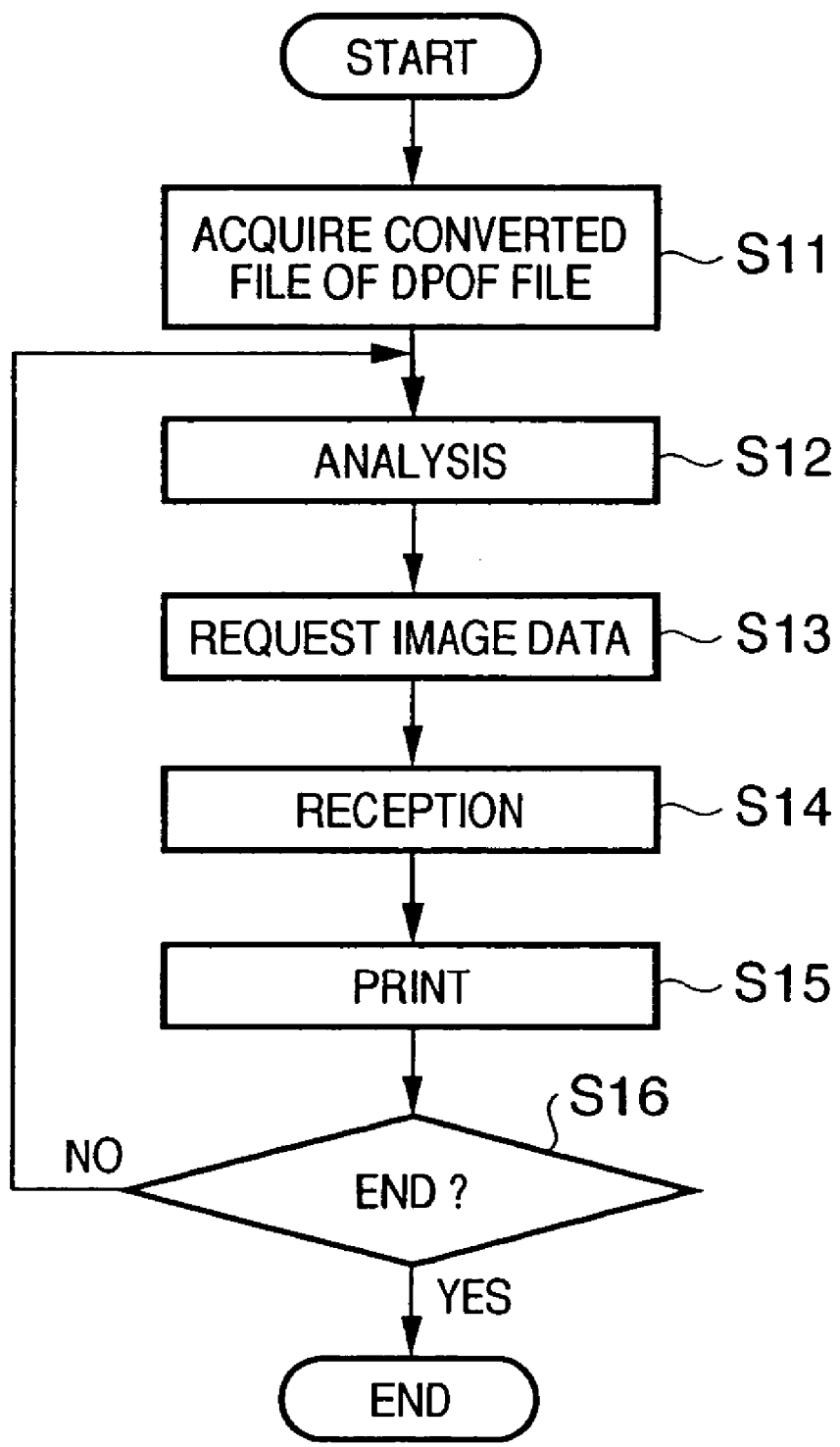
FIG. 10 is a flow chart showing part of the process of the printer according to the embodiment.

The PD printer 1000 performs a process shown in FIG. 10. An initial communication establishment process upon connecting the DSC has already been completed.

In step S11, the PD printer 1000 acquires the converted file (print instruction) of a DPOF file from the connected DSC 3012. As described above, the PD printer 1000 receives an object having a text attribute, and acquires a file which contains a character string serving as a specific key.

The PD printer 1000 advances to step S12 to analyze the file acquired in step S11 and acquire the handle of an image to be printed. In step S13, the PD printer 1000 requests data (image data) represented by the handle (this can be realized by a GetObject command). The PD printer 1000 receives the sent image data (step S14), and performs a print process (step S15).

The PD printer 1000 repeats processes in step S12 and subsequent steps until the above process is determined to have been done for all requests.

Consequently, only an image intended by the user can be printed even in a situation in which the digital camera and printer directly communicate with each other.

In the above description, a conversion process of a file name stored in a DPOF file is executed after creating a list in which all the objects held by the DSC 3012 are associated with handles.

However, the following arrangement is preferably adopted when a memory for storing a handle list for all the objects does not have any margin.

In checking the attribute of each object, as shown in FIG. 6, a DPOF file is analyzed in response to detection that the DPOF file has been recorded, and a print-designated file name is checked. The attribute of each object is checked again, as shown in FIG. 6. If an object having a print-designated file name is detected, a list in which the file name and handle are associated with each other is created. When association with handles ends for all print-designated file names, a conversion process such as step S2 of FIG. 9 is performed.

This arrangement can reduce the capacity of a list to be created.

If an object having a print-designated file name is detected, a conversion process of the file name in the DPOF file is parallel-executed, which can omit creation of a list.

It should be noted that the parallel process puts large processing burden and may increase the possibility of generating an operation error.

Second Example

The first example assumes that selection of an image to be printed is done using the UI of the DSC 3012 and the result is stored as a DPOF file before the DSC 3012 is connected to the PD printer 1000.

In the second example, after the DSC 3012 is connected to the PD printer 1000, the DSC 3012 acquires the function of the connected PD printer and sets print conditions in accordance with the printer function.

Two points should be noted. First, the DSC 3012 must be notified of the function (printable print sheet size or the like) of the PD printer 1000. Second, in the second example, a DPOF file is created using the UI of the DSC 3012 after connection to the PD printer. In connection, no DPOF file and converted print instruction file exist in the memory card 40 of the DSC 3012 (i.e., no handles representing these files exist).

Figure 11:
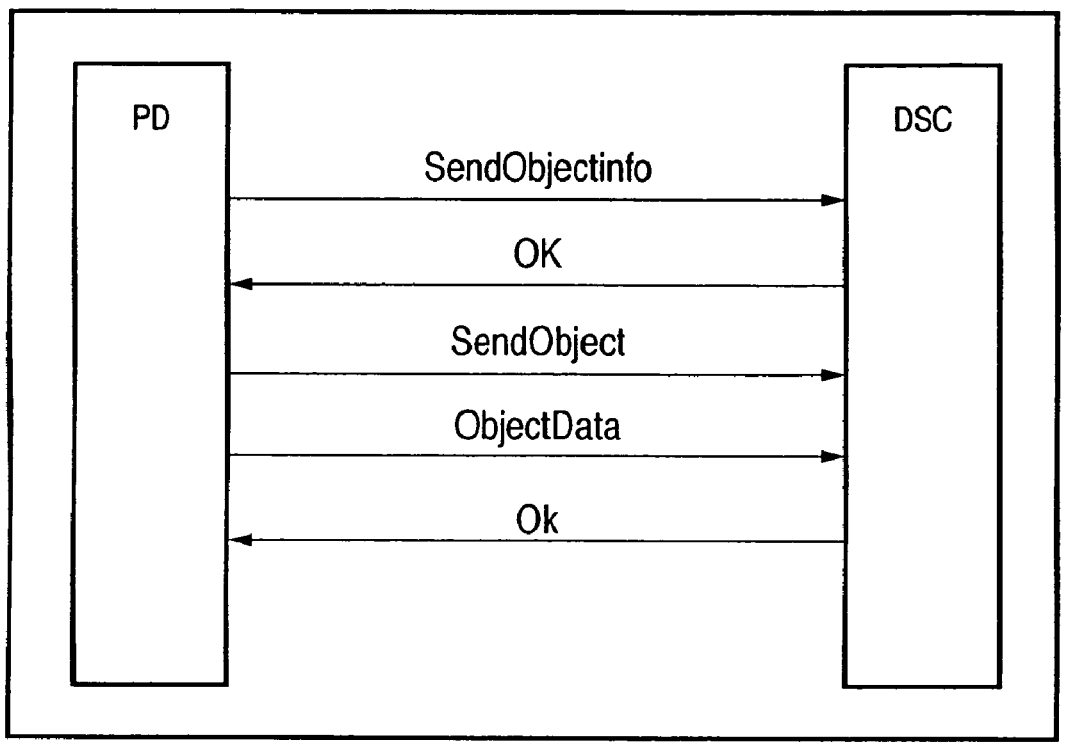
FIG. 11 is a view showing a sequence in transmitting an object from the printer to the digital camera.

For the first point, PTP has a command SendObjectInfo for inquiring whether to transmit information from the host side (PD printer) to the slave side (DSC 3012), and this command is utilized (see FIG. 11). That is, a text file which describes items representing the functions of the PD printer 1000 is prepared in the PD printer 1000 (e.g., stored in the ROM 2). The PD printer 1000 issues a command SendObjectInfo to the DSC 3012, and the DSC 3012 determines whether to accept the request (if so, the DSC 3012 sends back "OK"). Upon reception of "OK", the PD printer notifies the DSC 3012 of the file which describes function information of the PD printer (SendObject and ObjectData).

As for the second point, handles are reserved for a DPOF file and a print instruction file which is the conversion result of the DPOF file. For example, handles "00000001" and "00000002" are ensured in advance for the DPOF file and print instruction file, respectively. In assigning a handle to another object, another handle is assigned.

This can be achieved by the following process.

When the PD printer and DSC 3012 are connected, (the CPU 1 of) the PD printer 1000 transmits information representing the functions of the PD printer to the DSC 3012. Upon reception of the information, the DSC 3012 performs various setups such as selection of an image to be printed and the number of prints by using the UI of the DSC 3012 as far as the functions of the connected PD printer 1000 permit.

For example, an A4-size PD printer can print up to 2×2 images on one print sheet. Based on this, available layout candidates are narrowed.

This UI can be the same as a UI for print setups using DPOF when no printer is connected. The user can conveniently designate printing by the same operation without any consciousness of connection between the printer and the DSC.

Figure 12:
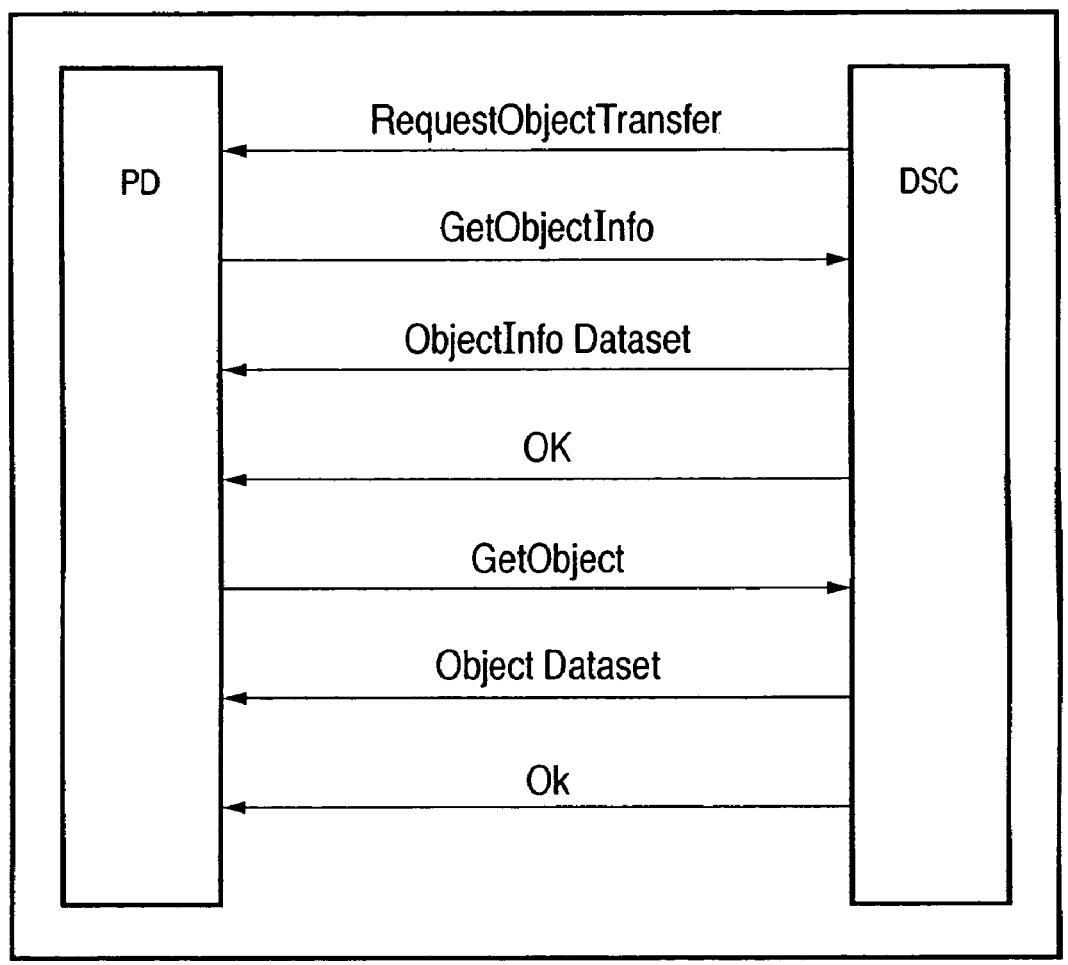
FIG. 12 is a view showing a sequence in transmitting an object from the digital camera to the printer.

At the end of print setups, a DPOF file is created. By using the completion of creation as a trigger, a conversion process of creating a new file (print instruction) in which at least a file described by a path name in the DPOF file created in the memory card 40 is replaced by a handle name is executed. The created print instruction file is transferred to the PD printer by, e.g., procedures shown in FIG. 12.

In order to notify the PD printer 1000 of information (print instruction) to be transmitted, the DSC 3012 notifies the PD printer of the information by using a command RequestObjectTransfer (at this time, reserved handles are designated as the handles of objects). When the PD printer 1000 is a printer according to this embodiment, the PD printer 1000 issues a command GetObjectInfo in response to the command RequestObjectTransfer. In response to this, the DSC 3012 transmits the contents of the converted file as ObjectInfo Dataset to the PD printer.

If the file is transmitted as ObjectInfo Dataset from the DSC 3012, the PD printer executes a print process in accordance with the contents of the file in accordance with the procedures shown in FIG. 10.

According to the second example, after the DSC 3012 is directly connected to the PD printer, print conditions can be set in accordance with the functions of the connected PD printer. The setup contents of the print conditions and the print result can coincide with each other.

Note that the second example may be combined with the first example. That is, if a DPOF file exists upon connecting the DSC 3012 to the PD printer, the first example is adopted; otherwise, the second example is adopted without determining an error.

Modification to Second Example

In the second example, handlers for a DPOF file and print instruction file are reserved. PTP has Event using a command AddObject when the USB slave (DSC 3012) generates a new object. By using this command, the PD printer 1000 can be notified of generation of a new object, and no handle need be reserved.

Third Example

In the first and second examples, the DSC 3012 converts a DPOF file, and outputs the result (print instruction file) to the PD printer 1000. In the third example, a DPOF file is transferred to the PD printer, and the PD printer ensures consistency between an image file expressed by a path name and a handler.

The PD printer 1000 first acquires a DPOF file from the DSC 3012. As described in the first example, files are narrowed down to a file having a text attribute. The PD printer 1000 issues a command GetObject for supplying the contents of the object to the DSC 3012, and sends a transmission request. Whether the file contents are DPOF can be easily determined by checking the description contents.

The PD printer 1000 analyzes the DPOF file transferred in this fashion, and extracts all path names+file names described in the DPOF file. The PD printer 1000 creates in the RAM 3 a text file of the extracted path names+file names, and describes at the start of the file a command or script for requesting a handler for each file.

Upon the completion of creating the text file for requesting a handler, the PD printer issues a command SendObject to the DSC 3012 in accordance with the procedures in FIG. 11, and notifies the DSC 3012 of transmission of an object. If the DSC 3012 sends back "OK", the PD printer outputs the created handler request file (object) to the DSC 3012.

Upon reception of the object, the DSC 3012 interprets the contents, and creates a text file (handler correspondence list) in which a character string representing a handler determined upon connection to the PD printer 1000 is added to each path name+file name described in the object. Upon the completion of the creation process, the DSC 3012 outputs the handler correspondence list file to the PD printer 1000 in accordance with the procedures in FIG. 12. That is, the DSC 3012 issues a command RequestObjectTransfer to the PD printer so as to receive the object. As a result, the PD printer issues a command GetObjectInfo for request object. In response to this, the DSC 3012 notifies the PD printer of the handler correspondence list (object).

Consequently, the PD printer acquires the DPOF file which has been received first, and the handler correspondence list file which describes the handlers of print target image files described in the DPOF file. As for a file name+path name described in DPOF, the PD printer requests the image from the DSC 3012 (command GetObject) by using a corresponding handler in the handler correspondence list, receives the image data, and performs a print process.

As the process of the PD printer at this time, step S11 of FIG. 10 is replaced by a process of acquiring a DPOF file and handler correspondence list, and the DPOF file and handler correspondence list are interpreted in step S12.

According to the third example, a print process by DPOF using a PTP protocol also becomes possible. In the third example, the PD printer 1000 receives a DPOF file in accordance with a request from the DSC 3012. It will readily occur to those skilled in the art that the present invention can also be applied to a case wherein print conditions are input in the DSC 3012 after the PD printer 1000 and DSC 3012 are connected.

As described above, according to the first to third examples, a print process intended by the user can be achieved by DPOF using an existing PTP protocol upon directly connecting a digital camera and printer via a USB interface. In conventional DPOF, print conditions are set independently of the printer function. According to the second example, print conditions can be set using UI on the basis of the printer capacity actually used for printing. An intended print result can be obtained without any difference between set contents and the print result.

This embodiment has exemplified communication using a PTP protocol by directly connecting a digital camera and printer via a USB interface, but the present invention is not limited to this. In short, the present invention can be applied to a case wherein a file stored in the storage device of either the digital camera or printer cannot be directly accessed by the path name under the interface and/or protocol constraint.

This embodiment has exemplified DPOF, but the present invention is not limited to DPOF and can be applied to a file which is described by a markup language such as HTML or a file in another format.

That is, the present invention can be applied to a print instruction in which a link destination designated by a file name or the like is converted into a handle and designated by a description language such as HTML.

Most of digital cameras comprise a USB interface. Considering direct utilization of the hardware resource, USB connection is desirable and reduces the burden on the digital camera vendor.

When the above embodiment is to be realized, especially when the digital camera vendor is to realize the process or function of the DSC 3012 described in the embodiment, this can be realized by updating firmware (program) at low cost.

As has been described above, according to the present invention, even a system which transfers image data by a handle upon reception of a print request list described by the file name or path name of an image can transfer and print an intended image.

As many apparently widely different embodiments of the present invention can be made without departing from the spirit and scope thereof, it is to be understood that the invention is not limited to the specific embodiments thereof except as defined in the appended claims.

The invention claimed is:

1. An image supply apparatus which has an interface for communicating with a printer using a Picture Transfer Protocol (PTP) and a removable storage medium, wherein the apparatus receives a transfer request for an image to be printed from the printer, the transfer request including a handle number that has a format defined in the PTP and specifies an image stored in the removable storage medium, and supplies the image specified by the handle number to the printer, comprising:

a designating unit configured to designate at least one image to be printed among images stored in the removable storage medium independently of a connection with the printer via the interface and for storing information specifying the designated images into the removable storage medium as a DPOF (Digital Print Order Format) file, where, in the DPOF file, each of the designated images is described using a file name with a path name different from the handle number used in the PTP;

a conversion unit configured to perform a conversion process, if a DPOF file exists in the removable storage medium when the image supply apparatus can communicate with the printer via the interface using the PTP, in order to generate, from the DPOF file, a new print request list including new print request information in which at least a description of the file name in the DPOF file is converted into a description expressed in a handle number usable in the PTP;

a transmitting unit configured to transmit the new print request list to the printer using the PTP; and a transferring unit configured to transfer, in response to receiving from the printer a transfer request including the handle number described in the new print request list transmitted to the printer, an image specified by the handle number included in the received transfer request that includes the handle number described in the new print request list transmitted to the printer.

2. The apparatus according to claim 1, wherein the interface with the printer is a USB (Universal Serial Bus) interface.

3. The apparatus according to claim 1, wherein the image supply apparatus further comprises an image sensing unit configured to optically sense an image, and a user interface configured to designate creation of the DPOF file to be generated by said designation unit.

4. The apparatus according to claim 1, wherein the handle number is a numeric character.

5. A method of controlling an image supply apparatus which has an interface for communicating with a printer using a Picture Transfer Protocol (PTP) and a removable storage medium, wherein the apparatus receives a transfer request from the printer for an image to be printed, said transfer request including a handle number that has a format defined in the PTP that specifies an image stored in the removable storage medium, and supplies the image specified by the handle number to the printer, comprising:

a designating step of designating at least one image to be printed among images stored in the removable storage medium independently of a connection with the printer via the interface and of storing information specifying the designated images into the removable storage medium as a DPOF (Digital Print Order Format) file, where, in the DPOF file, each of the designated images is described using a file name with a path name different from the handle number used in the PTP;

a conversion step of performing a conversion process, if a DPOF file exists in the removable storage medium when the image supply apparatus can communicate with the printer via the interface using the PTP, in order to generate, from the existing DPOF file, a new print request list including new print request information in which at least a description of the file name in the existing DPOF list is converted into a description expressed in a handle number usable in the PTP;

a transmitting step of transmitting the new print request list to the printer using the PTP; and a transferring step of transferring, in response to receiving from the printer a transfer request including the handle number described in the new print request list transmitted to the printer, an image specified by the handle number included in the received transfer request including a handle number described in the new print request list transmitted to the printer.

6. The method according to claim 5, wherein the interface with the printer is a USB (Universal Serial Bus) interface.

7. The method according to claim 5, wherein the image supply apparatus comprises an image sensing unit configured to optically sense an image, and a user interface configured to designating creation of the DPOF file.

8. A print system constituted by a printer and an image supply apparatus which has an interface for communicating with the printer using a Picture Transfer Protocol (PTP) and a removable storage medium, wherein the image supply apparatus receives a transfer request from the printer for an image to be printed, said transfer request including a handle number that has a format defined in the PTP and specifies an image stored in the removable storage medium, and supplies the image specified by the handle number to the printer, wherein the printer comprises:

a receiving unit which receives from the image supply apparatus a print request list in which information specifying an image to be printed is described in a format expressed in a handle number usable in the PTP;

a request unit which requests an image to be printed by using the handle number described in the received print request list; and a print unit which prints an image transferred from the image supply apparatus as a result of the request by said request unit, and wherein the image supply apparatus comprises:

a designating unit configured to designate at least one image to be printed among images stored in the removable storage medium independently of a connection with the printer via the interface and to store information specifying the designated images into the removable storage medium as a DPOF (Digital Print Order Format) file, where, in the DPOF file, each of the designated images is described using a file name with a path name different from the handle number used in the PTP;

a conversion unit which performs a conversion process, if a DPOF file exists in the removable storage medium when the image supply apparatus can communicate with the printer via the interface using the PTP, in order to generate, from the DPOF file, a new print request list including new print request information in which at least a description of the file name in the DPOF file is converted into a description expressed in a handle number usable in the PTP, a transmit unit which transmits the new print request list to the printer via the interface using the PTP, a reception unit which receives, from the printer via the interface using the PTP, an image transfer request including the handle number described in the new print request list transmitted to the printer, and a transfer unit which transfers, to the printer, an image specified by the handle number in the received image transfer request from the printer.

* * * * *